US008280909B2

(12) United States Patent
Mabuchi et al.

(10) Patent No.: US 8,280,909 B2
(45) Date of Patent: *Oct. 2, 2012

(54) DISTRIBUTED DATABASE SYSTEM AND RETRIEVAL SERVER AND RETRIEVAL METHOD FOR THE SAME

(75) Inventors: Tsuyoshi Mabuchi, Tokyo (JP); Tetsuo Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 553 days.

This patent is subject to a terminal disclaimer.

(21) Appl. No.: 12/049,079

(22) Filed: Mar. 14, 2008

(65) Prior Publication Data

US 2008/0228778 A1    Sep. 18, 2008

(30) Foreign Application Priority Data

Mar. 16, 2007  (JP) ................................ 2007-068241

(51) Int. Cl.
*G06F 7/00* (2006.01)
(52) U.S. Cl. ...................................................... 707/791
(58) Field of Classification Search ........................ None
See application file for complete search history.

(56) References Cited

U.S. PATENT DOCUMENTS

| 5,825,884 | A | * | 10/1998 | Zdepski et al. | ................. 705/78 |
| 6,834,112 | B1 | * | 12/2004 | Brickell | ........................ 380/279 |
| 2007/0165273 | A1 | * | 7/2007 | Miyamura et al. | ........... 358/1.15 |
| 2008/0065878 | A1 | * | 3/2008 | Hutson et al. | ................. 713/153 |
| 2008/0097786 | A1 | * | 4/2008 | Sachdeva | ......................... 705/2 |
| 2009/0198657 | A1 | * | 8/2009 | Hattori | ............................ 707/3 |

FOREIGN PATENT DOCUMENTS

JP          9293006 A     11/1997

* cited by examiner

Primary Examiner — Thu Nga Nguyen

(57) ABSTRACT

A plurality of database hosts hold subscriber information in a distributed manner. A retrieval server processes inquires (host retrieval requests) on which of the database hosts has desired subscriber information stored therein. The retrieval server includes a plurality of processors, and the plurality of processors performs processing in parallel. Therefore, inquiries can be processed at a high speed. Further, a conversion information database and a host information database are provided as in-memory databases, which allow inquiry processes to be processed at a high speed. A call control server can efficiently acquire subscriber information from the database host based on the result of an inquiry made to the retrieval server.

7 Claims, 7 Drawing Sheets

CONVERSION DB1121

| HASH VALUE | PUID |
|---|---|
| 000 | A |
| 001 | B |
| 010 | C |
| 011 | A |
| 110 | B |
| ... | |

FIG. 5A

HOST INFORMATION DB1122

| HASH VALUE | SUBSCRIBER ID | HOST ID |
|---|---|---|
| 010 | aaa@zzz | 2 |
| ... | ... | ... |

FIG. 5B

DISTRIBUTED DATABASE SYSTEM AND RETRIEVAL SERVER AND RETRIEVAL METHOD FOR THE SAME

This application is based upon and claims the benefit of priority from Japanese patent application No. 2007-068241, filed on Mar. 16, 2007, the disclosure of which is incorporated herein in its entirety by reference.

BACKGROUND OF THE INVENTION

1. Field of the Invention

The present invention relates to a distributed database system and a retrieval server and retrieval method for the system.

2. Description of the Related Art

For example, a technique for distributed disposal of data in a distributed database system constituted by a plurality of CPUs (Central Processing Units) having a storage device is disclosed in Patent Document 1 (JP-A-9-293006). According to the technique disclosed in Patent Document 1, ID (Identification Data) of CPUs in which a record is to be stored are calculated using a hash function, and the record is distributed and stored in the storage devices of the CPUs according the ID. When the data is retrieved, the CPUs retrieve the respective storage devices in parallel.

SUMMARY OF THE INVENTION

However, it is not efficient to retrieve all of the storage devices in parallel.

The invention was made taking the above-described situation into consideration, and it is an exemplary object of the invention to allow data distributed in a distributed database system to be efficiently retrieved.

According to an exemplary aspect of the invention, a database system is provided. The database system comprises a plurality of database servers and a retrieval server connected to the plurality of database servers through a network and including a plurality of processors. Each of the plurality of database servers comprises an information storage section that stores data in association with key information to store different data in each database server and an information acquisition section that acquires data associated with key information from the information storage section upon receipt of the key information.

Each of the processors of the retrieval server comprises a layout information storage section that stores a different record in each processor based on a hash value. One record is formed by associating the key information, the hash value of the key information, and host identification information identifying the database server having the information storage section holding data identified by the key information.

Each of the processors of the retrieval server further comprises a processor information storage section that stores association between each of the hash values stored in the layout information storage sections provided in all of the processors and processor identification information identifying the processor having the layout information storage section in which the hash value is stored.

Each of the processors of the retrieval server still further comprises an information retrieval section that calculates a hash value of key information when the key information is received, acquires processor identification information associated with the calculated hash value from the processor information storage section, identifies a processor based on the acquired processor identification information, and acquires host identification information associated with the key information and the hash value of the same from the layout information storage section of the processor thus identified.

According to another exemplary aspect of the invention, a retrieval server including a plurality of processors is provided. Each of the plurality of processors comprises a distribution information storage section that stores a different record in each processor based on a hash value. One record is formed by associating the key information, a hash value of the key information, and data.

Each of the plurality of processors further comprises a processor information storage section that stores association between each of the hash values stored in the distribution information storage sections provided in all of the processors and processor identification information identifying the processor having the distribution information storage section in which the hash value is stored.

Each of the plurality of processors still further comprises an information retrieval section that calculates a hash value of key information when the key information is received from the outside as a retrieval condition, acquires processor identification information associated with the calculated hash value from the processor information storage section, identifies a processor based on the acquired processor identification information, and acquires data associated with the key information and the hash value of the same from the layout information storage section of the processor thus identified.

According to still another exemplary aspect of the invention, a method of retrieving data with a retrieval server including a plurality of processors is provided. The method comprises a distribution information storing step for storing a different record in a distribution information storage section provided in each of the processors based on a hash value, one record being formed by associating the key information, a hash value of the key information, and data.

The method further comprises a processor information storing step for storing, in a processor information storage section of each processor, each of all the hash values stored in the distribution information storage sections provided in the plurality of processors in association with processor identification information identifying the processor having the distribution information storage section storing the hash value.

The method still further comprises an information retrieval step for calculating a hash value of key information at an information retrieval section of each of the processors when the key information is received from the outside as a retrieval condition, acquiring processor identification information associated with the calculated hash value from the processor information storage section, identifying a processor based on the acquired processor identification information, and acquiring data associated with the key information and the hash value of the same from the distribution information storage section of the processor thus identified.

According to yet another exemplary aspect of the invention, a recording medium having a program recorded therein is provided. The program is for causing each of a plurality of processors included in a retrieval server to execute:

a distribution information storing step for storing a different record in each of the processors based on a hash value of key information, one record being formed by associating the key information, a hash value of the key information, and data;

a processor information storing step for storing each of all the hash values stored in the distribution information storage step by the plurality of processors in association with processor identification information identifying the processor with which the hash value is stored; and an information retrieval step for calculating a hash value of key information when the key information is received from the outside as a retrieval condition, acquiring processor identification information associated with the calculated hash value from among information stored at the processor information storing step, acquiring data associated with the key information and the hash value of the same from among information stored by the processor itself at the distribution information storing step when the acquired processor identification information is the identification of the processor itself, and acquiring data associated with the key information and the hash value of the same from among information stored at the distribution information storing step by the processor identified by the processor identification information when the acquired processor identification information is the identification of a processor other than the processor itself.

According to the invention, it is possible to carry out retrieval efficiently in a distributed database system.

BRIEF DESCRIPTION OF THE DRAWINGS

FIG. 5A shows an example of a data layout for a conversion database;

FIG. 5B shows an example of a data layout for a host information database;

DESCRIPTION OF PREFERRED EMBODIMENT OF THE INVENTION

An exemplary embodiment of the invention will now be described with reference to the drawings. As an exemplary embodiment of the invention, an IP (Internet Protocol) telephone system for providing telephone services based on packet communication techniques will be described, and the description will focus on a call-up process in such a system.

Figure 1:
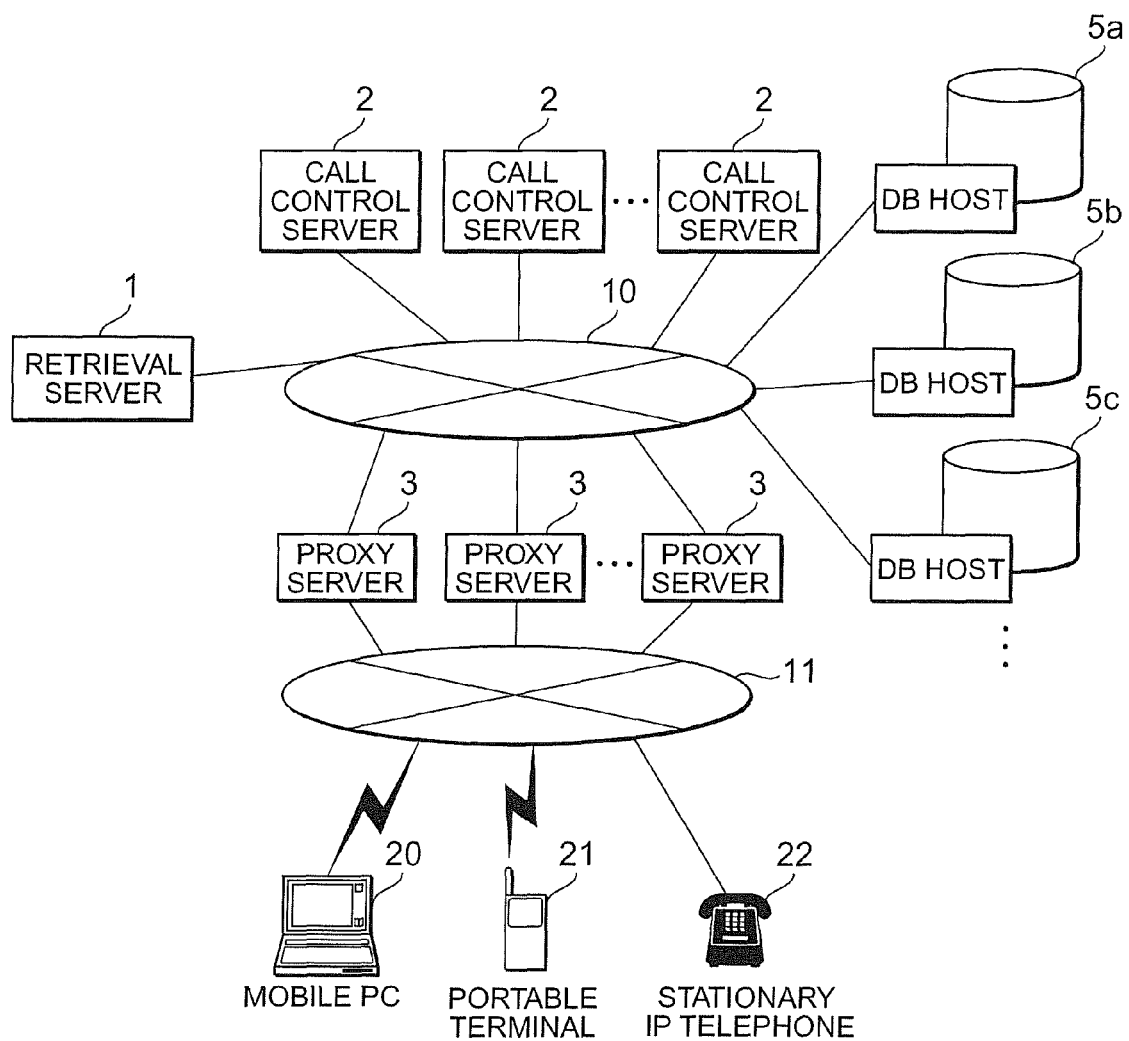
FIG. 1 is a block diagram showing an example of a configuration of an IP telephone system according to an exemplary embodiment of the invention.

FIG. 1 is a block diagram showing an example of a configuration of an IP telephone system according to the exemplary embodiment of the invention. As shown in FIG. 1, the IP telephone system is configured by connecting an internal network 10 to an external network 11 through a proxy server 3. A call control server (computer) 2, a retrieval server 1, and a plurality of database (hereinafter abbreviated as DB) hosts (database servers) 5a to 5c are connected to the internal network 10. A call request from an IP telephone terminal such as a mobile PC (personal computer) 20, portable terminal 21, or stationary IP telephone 22 using the IP telephone system is received by the call control server 2 through the external network 11 and the proxy server 3 and processed by the call control server 2.

Although FIG. 1 shows three DB hosts, the number of the DB hosts is not limited to three. Similarly, a plurality of the call control servers 2 and proxy servers 3 may be connected to the system. In the IP telephone system of the present embodiment, each of the plurality of proxy servers transmits a request from a mobile PC 20, portable terminal 21, or stationary IP telephone 22 to any of the plurality of call control servers 2.

Each component of this IP telephone system will now be described in detail.

The proxy servers 3 are servers for enabling single source management of communications between the internal network 10 and the external network 11 in order to prevent unauthorized access to the internal network 10 from the external network 11. All requests for use of IP communication services from the mobile PCs 20, portable terminals 21, and stationary IP telephones 22 are transmitted to the call control servers 2 through the proxy servers 3. The call control servers 2 are servers for calling a call destination address specified by a mobile PC 20, portable terminal 21, or a stationary IP telephone 22 to establish a call between the call source and the call destination.

Figure 2:
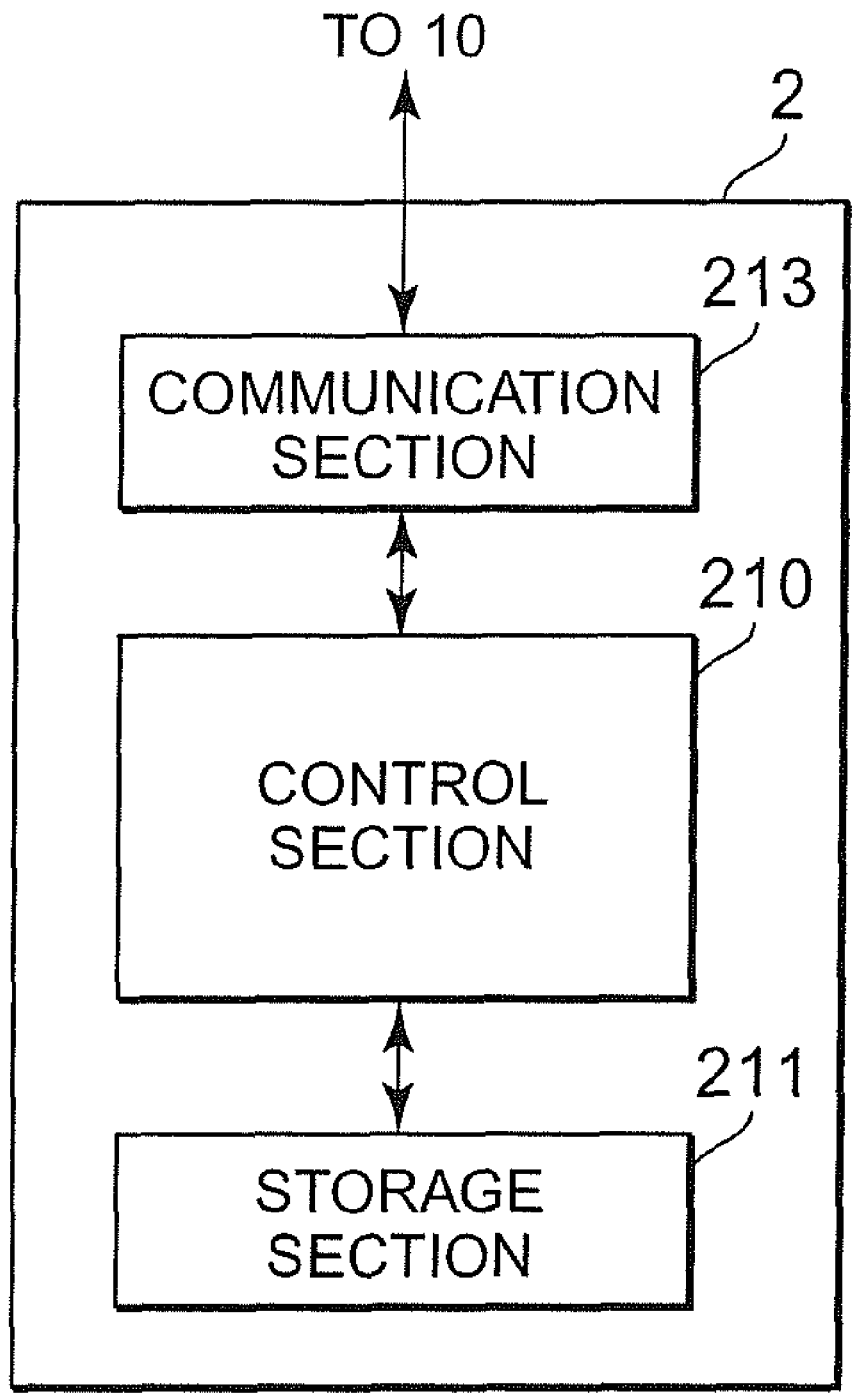
FIG. 2 is a block diagram showing an example of a configuration of a call control server shown in FIG. 1.

As shown in FIG. 2, a call control server 2 includes a control section (data acquisition section) 210, a storage section 211, and a communication section 213.

The control section 210 is constituted by a CPU, an ROM (Read Only Memory), and an RAM (Random Access Memory) which are not shown, and controls the whole of call control server 2. Specifically, the CPU executes programs stored in the ROM and the storage section 211, which will be described later, to perform control and calculation processes. When the control and calculation processes are performed, the control section 210 temporarily stores various types of data in the RAM to use it as a work area.

The storage section 211 is constituted by a hard disk or the like, and programs stored in the section include programs used by the control section 210 for executing a process of authenticating a calling subscriber and establishing a call.

The communication section 213 includes a communication interface, and it is provided for communicating with the retrieval server 1 which will be described later and the DB hosts 5a to 5c through the internal network 10. The communication section 213 may also include a modem device and an infrared communication device.

Figure 4:
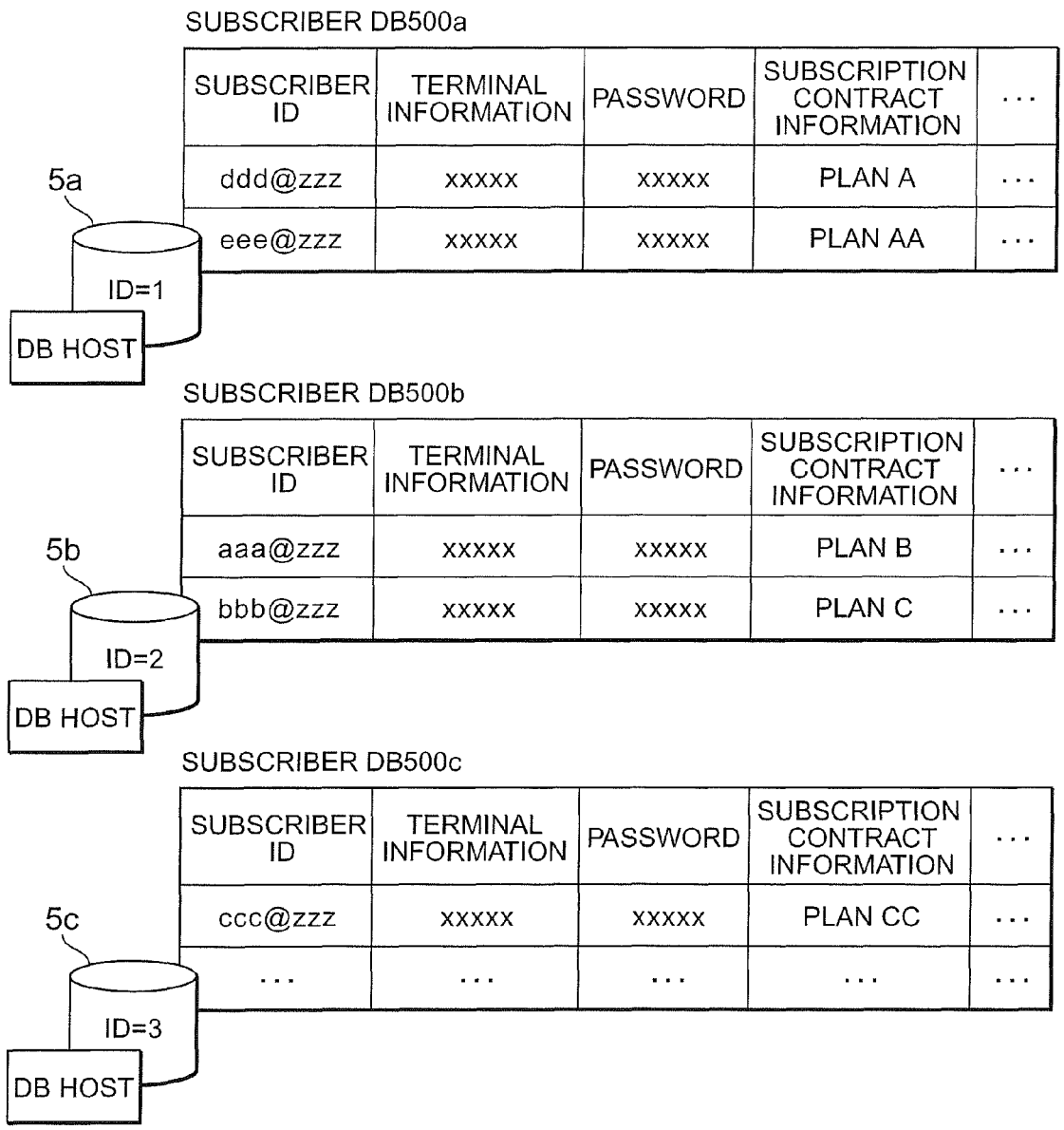
FIG. 4 shows an example of a data layout for subscriber information databases.

The DB hosts 5a to 5c are host computers having information on subscribers of telephone services provided by the IP telephone system. As shown in FIG. 4, the DB hosts 5a to 5c include subscriber DBs 500a to 500c in which the subscriber information is stored in a distributed manner.

Specifically, in each record in the subscriber DBs 500a to 500c, information on a subscriber such as terminal information, password, and subscription contract information are stored in association with subscriber ID (key information or client address). Subscriber ID is identification information for identifying a subscriber to the IP telephone services. Terminal information is identification information for identifying a terminal used by a subscriber. Subscription contract information is information indicating a charge plan or discount plan on which a subscriber has made a contract.

The retrieval server 1 is a server which performs a host retrieval process, i.e., a process of identifying a host having subscriber information requested by a call control server 2 from among the DB hosts 5a to 5c and returning the ID (identification information) of the host in response to a host retrieval request from the call control server 2.

A plurality of subscriber information are stored in each of the DB hosts 5a to 5c in a distributed manner. Therefore, in order to acquire desired subscriber information efficiently, a call control server 2 must know which of the DB hosts 5a to 5c has the desired information stored therein, and such information is provided by the retrieval server 1.

When a call control server 2 transmits a host retrieval request to the retrieval server 1 by specifying subscriber ID, the host ID of a DB host 5 having the subscriber information identified from the subscriber ID is returned. The call control server 2 can acquire the subscriber information efficiently by inquiring of the DB host 5 identified by the returned host ID about the subscriber information.

Figure 3:
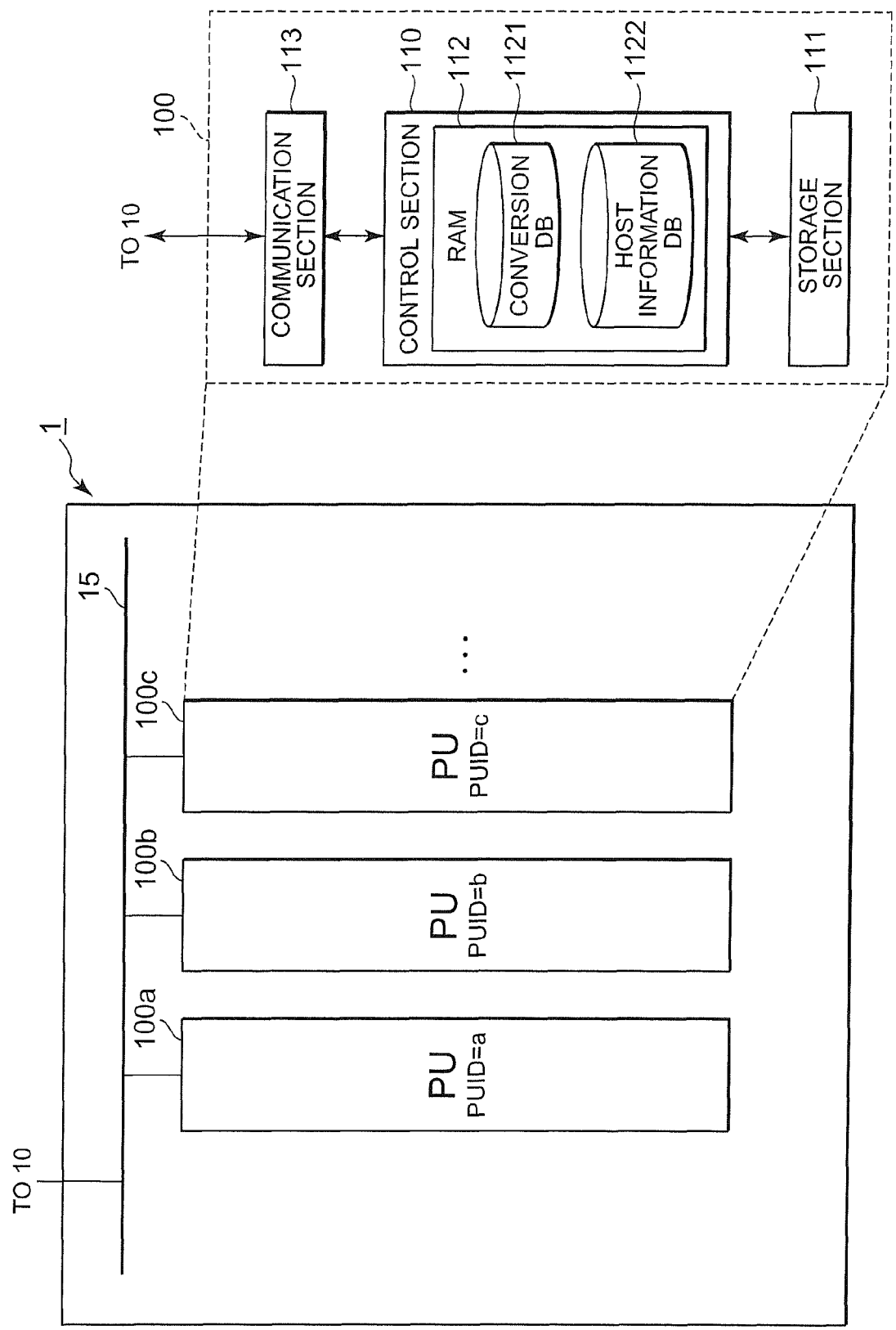
FIG. 3 is a block diagram showing an example of a configuration of a retrieval server shown in FIG. 1.

In executing a call-up process, the call control sever 2 always inquires of the retrieval server 1 about the DB hosts 5 (a host retrieval request). Therefore, in order to prevent such a host retrieval request from constituting a bottleneck of a call-up process, the retrieval server 1 has what is called multiprocessor system configuration in which a plurality of PUs (Processing Units) 100a to 100c are connected to a bus 15 as shown in FIG. 3. The PUs cooperate in parallel to process a host retrieval request. Although the retrieval server 1 is shown as having three processors (PUs) in FIG. 3, the invention is not limited to such a configuration, and what is required is that at least one processor is provided. Since the plurality of PUs 100a to 100c operate in parallel to process the host retrieval request from the call control server 2, the host retrieval process can be executed at a high speed. A specific flow of a host retrieval process will be described in detail in the following description of operations of the retrieval server 1.

A configuration of the PUs 100a to 100c provided in the retrieval server 1 will now be described. Each of the PUs 100a to 100c includes a control section (information retrieval section) 110, a storage section 111, an RAM 112, and a communication section 113.

The control section 110 is constituted by a CPU (not shown), an ROM (not shown), and the RAM 112 and controls the PU 100 and cooperates with the control sections of the other PUs by exchanging information through the bus 15 to control the whole of retrieval server 1. Specifically, the CPU executes programs stored in the ROM and the storage section 111, which will be described later, to perform control and calculation processes. When the control and calculation processes are executed, the control section 110 temporarily stores various types of data in the RAM 112 to use it as a work area.

A conversion DB (processor information storage section) 1121 and a host information DB (layout information storage section or distribution information storage section) 1122 are also stored in the RAM 112 as in-memory DBs. As shown in FIG. 5B, hash values, subscriber ID, host ID are stored in association with each other in the host information DB 1122. A hash value is a result obtained by applying a hash function to subscriber ID identifying a subscriber to services provided by the IP telephone system. The subscriber ID is information identifying the subscriber. Host ID is information identifying the DB host 5 in which subscriber information on the subscriber identified by the subscriber ID is stored.

A hash function is a function providing numerical values which are limited to a certain range. As a result of the use of a hash function, any subscriber ID is divided into several sets of data each having the same hash value. Data are stored in the host information DB 1122 of each PU 100 in a distributed manner according to hash values. Although a remainder calculation is normally used as a hash function, the invention is not limited to such a function, and any function may be used as long as it provides numerical values limited to a certain range.

As shown in FIG. 5A, PUID (Processor Unit ID; PU identification information) is stored in association with each record in the conversion DB 1121, a hash value serving as a key for such association. A hash value is calculated from subscriber ID and is stored in the host information DBs 1122 of all PUs 100. PUID is information which identifies the PU having stored therein the host ID identifying the DB host 5 having subscriber information identified by the subscriber ID from which the hash value has been calculated. That is, data to be stored in the host information DB 1122 of each PU 100 are determined based on hash values, and association between hash values and the PUs 100 is stored in the conversion DBs 1121.

All hash values calculated from subscriber ID are stored in the conversion DBs 1121 as key information. Conversion DBs 1121 having the same contents are stored in the RAMs 112 of the respective PUs 100a to 100c. Since hash values obtained from subscriber ID are used as key information, the conversion DB 1121 having the same contents can be stored in the RAMs 112 provided in all of the PUs 100a to 100c as thus described.

The storage sections 111 of the PUs 100a to 100c are constituted by hard disks or the like, and programs used by the control sections 110 to execute retrieval processes are stored in those sections. Since the contents of the conversion DBs 1121 and the host information DBs 1122 which are in-memory DBs stored in the RAMs 112 are erased when the power supply is turned off, backups for the DBs are also stored in the storage sections 111.

The communication sections 113 of the PUs 100a to 100c include a communication interface, and they are provided for communication with the call control server 2 through the internal network 10. The communication section 113 may include a modem device or an infrared communication device.

Figure 6:
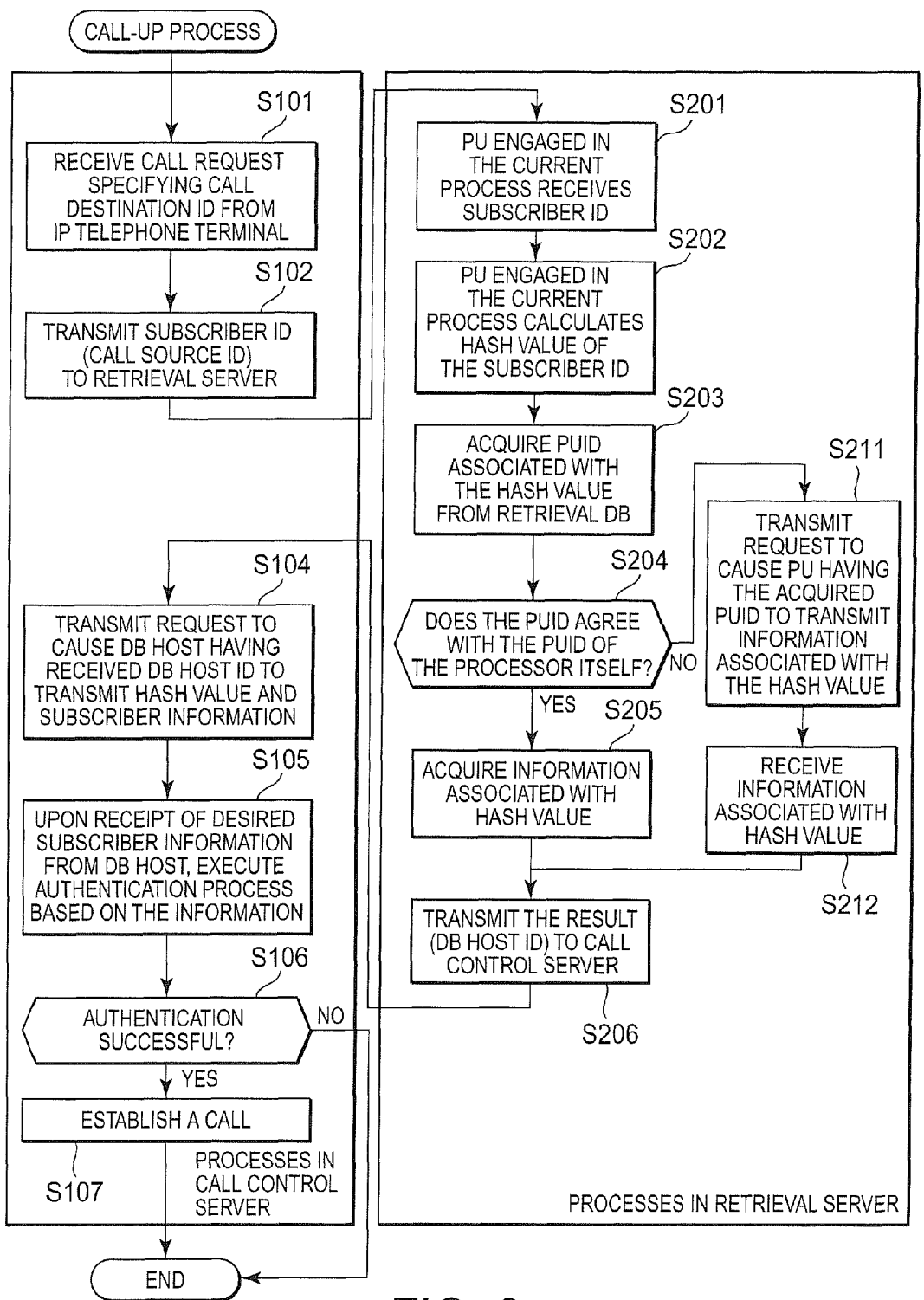
FIG. 6 is a flow chart showing processes in a retrieval server according to the exemplary embodiment of the invention.

A description will now be made with reference to FIG. 6 on a flow of a call-up process executed by the call control server 2 based on information stored in the various types of DBs described above. In the following description, the mobile PCs 20, portable terminals 21, and stationary IP telephones 22 will be collectively referred to as IP telephone terminals.

An IP telephone terminal (a mobile PC 20, portable terminal 21, or stationary IP telephone 22) transmits a call request to a call control server 2 through a proxy server 3 by specifying a call destination ID (the subscriber is not required to be a subscriber to services provided by the IP telephone system). When the call request is transmitted, information including the subscriber ID of the call source, the password for authentication, and information identifying the IP telephone terminal stored in the IP telephone terminal of the call source are simultaneously transmitted. Upon receipt of the call request (step S101), the call control server 2 transmits the subscriber ID of the call source to the retrieval server 1 and makes an inquiry (a host retrieval request) about the host ID of the DB host 5 having the subscriber information identified by the subscriber ID (step S102).

The call control server 2 executes a call-up process based on a protocol referred to as SIP (Session Initiation Protocol) and utilizes SIP addresses used in the SIP protocol to specify the call source and the call destination. An SIP address has a form resembling an E-mail address, e.g., "user ID@SIP domain name". Such SIP addresses are used as subscriber ID. The IP telephone call-up process may be performed using a protocol other than SIP. In such a case, telephone numbers or the like may be used as ID of the call source and the call destination instead of SIP addresses.

A description will now be made on a flow of processes performed by the retrieval server 1 on host retrieval requests from the call control servers 2.

The PUs 100a to 100c of the retrieval server 1 have a program for distributing loads (load distribution program) stored in the respective storage sections 111. Control is exercised such that the PUs sequentially accept and process inquiries (host retrieval requests) from the call control severs 2. When a next retrieval request is transmitted before one PU 100 finishes the current retrieval process, another PU 100 performs the other host retrieval process in parallel. Methods for process distribution are set in advance to allow selection of a round-robin method and other methods, e.g., a method in which a process is allocated to the PU 100 having the lightest load at the point in time of interest.

The control section 110 of the PU 100 which has been determined to undertake the current process by the load distribution program first receives the call source ID (subscriber ID) of the call source and the call destination ID from the call control server 2 (step S201). Then, the control section 110 engaged in the current process calculates the hash value of the subscriber ID thus received (step S202) and retrieves the conversion DB 1121 to acquire PUID associated with the calculated hash value (step S203). If the acquired PUID agrees with the ID of the PU to which the control section belongs (step S204; Yes), the control section 110 refers to the host information DB 1122 of the RAM 112 of itself to acquire host ID associated with the calculated hash value and the subscriber ID (step S205).

If the PUID acquired at step S203 is the PUID of another PU (step S204; No), the other PU having the PUID is requested to transmit the host ID associated with the hash value and the subscriber ID (step S211). Upon receipt of the request, the other PU refers to the host information DB 1122 of the control section 110 of itself and transmits the host ID of interest to the request source. Upon receipt of the transmitted host ID (step S212), the control section 110 of the PU 100 engaged in the current process returns the result to the call control server 2 (step S206).

Figures 7A, 7B:
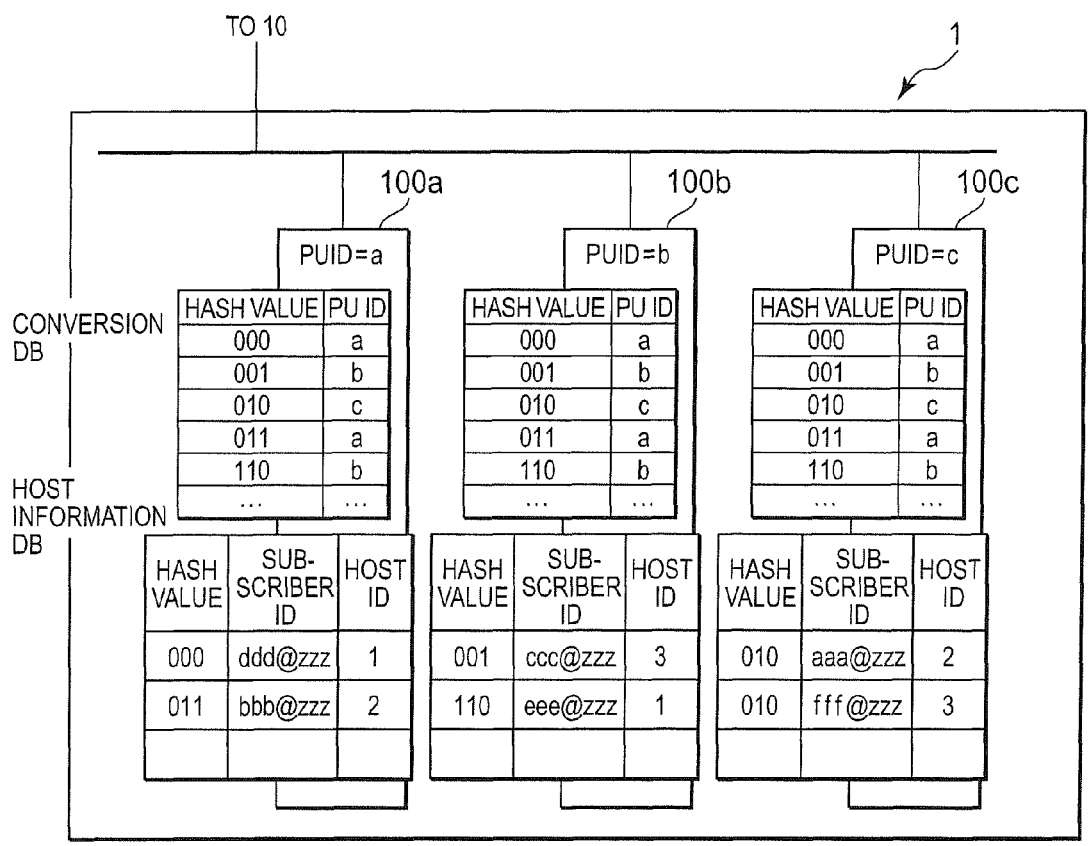
FIG. 7A is an illustration for explaining a conversion process for acquiring hash values from subscriber ID.
FIG. 7B is an illustration showing contents of conversion databases and host information databases held by a plurality of processing units in a retrieval server.

The processes at the above-described steps S101 and S102, and steps S202 to S212 will now be described using a specific example. Let us assume that the PU 100a having PUID "a" receives a host retrieval request concerning host ID of a DB host 5 having subscriber information including subscriber ID "aaa@zzz" from a call control server 2. Let us also assume that subscriber IDs are associated with hash values as shown in FIG. 7A at this time and that the conversion DBs 1121 and the host information DBs 1122 provided in the PUs 100a to 100c have contents as shown in FIG. 7B. Then, the PU 100a first calculates the hash value of the subscriber ID "aaa@zzz". Since the hash value calculated from the subscriber ID "aaa@zzz" is "010" as shown in FIG. 7A, the PU 100a refers to the conversion DB 1121 to search for PUID associated with the hash value "010". The PUID associated with the hash value "010" is "c". Therefore, the PU 100a judges that the unit itself does not have host information associated with the hash value "010". The hash value and the subscriber ID "aaa@zzz" are transmitted to the PU 100c whose PUID is "c" to request it to return the host information (host ID). Upon receipt of the request, the PU 100c refers to the host information DB 1122 and transmits "2", which is the host ID stored in association with the hash value "010" and the subscriber ID "aaa@zzz" thus received, to the call control server 2.

Upon receipt of the host ID from the retrieval server 1, the call control server 2 transmits the subscriber ID to the DB host 5 identified by the received host ID and inquires of the host to request it to transmit subscriber information associated with the subscriber ID (step S104). Upon receipt of the inquiry, the DB host (information acquisition section) 5 refers to the subscriber DB (information storing section) 500 (see FIG. 4) to acquire all subscriber information associated with the subscriber ID and returns them to the call control server 2.

For example, in the case of the subscriber ID "aaa@zzz" described above, the call control server 2 inquires of the DB host 5b (see FIG. 4) that is identified by host ID "2", and the DB host 5b refers to the subscriber DB 500b to return subscriber information associated with the subscriber ID "aaa@zzz" to the call control server 2.

The call control server 2 checks the password and terminal information included in the received subscriber information against information transmitted from the IP telephone terminal (which is a mobile PC 20, portable terminal 21 or stationary IP telephone 22) through the proxy server 3 to authenticate the call source (step S105). When the authentication of the password and terminal information is successful (step S106; Yes), a call request is sent to the call destination ID transmitted from the IP telephone terminal based on the SIP protocol to establish a call (step S107). When the authentication fails, the call-up process is terminated (step S106; No). The charging is carried out based on subscription contract information received form the DB host 5.

As described above, the DB hosts 5a to 5c hold subscriber information in a distributed manner. The retrieval server 1 accepts and processes inquiries on which of the DB hosts 5a to 5c has desired subscriber information stored therein (host retrieval requests). The retrieval server 1 includes a plurality of PUs which execute processes in parallel, and inquiries can therefore be processed at a high speed. Further, inquiry processes can be carried out at a high speed because the conversion DBs 1121 and the host information DBs 1122 are in-memory DBs. Since the RAM 112 of the control section 110 of each PU has a limited capacity, the host information DB 1122 is stored in each PU 100 in a distributed manner, and the conversion information DB 1121 is stored in all of the PU 100. Thus, a call control server 2 can efficiently acquire subscriber information from a DB host 5 based on host ID obtained by inquiring of the retrieval server 1.

Although an exemplary embodiment of the invention has been described above, the invention is not limited to the above-described embodiment and may be implemented in various forms of modification and application.

For example, a database system for applications other than IP telephones may be constructed using the host DBs 5 and the retrieval server 1. That is, arbitrary types of data may be held in the host DBs 5. The retrieval server 1 may hold layout information indicating the locations among the plurality of host DBs 5 where the arbitrary types of data are stored.

The retrieval server 1 may be used alone as a database server instead of storing the layout information in the same.

The above embodiment has been described as a case in which control programs of the retrieval server 1 are stored in the storing section in advance. Alternatively, the retrieval server 1 may be provided with any appropriate device for reading storage media such as flexible disks, CD-ROMs (Compact Disk Read-Only Memories), DVDs (Digital Versatile Disks), MOs (Magneto-Optical disks) and USB (Universal Serial Bus) memories, and control programs may be stored in such storage media for distribution. An apparatus enabled for execution of the above-described processing operations by installing such programs may be provided.

The control programs may alternatively be stored in advance in a disk device provided in a predetermined server apparatus on the internal network 10 or external network 11 and may be downloaded to the retrieval server 1. Further, the above-described processes may be carried out by activating and executing the programs while transferring them through the internal network 10 or external network 11.

The retrieval server 1 of the above-described embodiment may be implemented in the form of dedicated hardware instead of the configuration in which control is exercised through execution of a program at each control section.

The database server according to the invention may be implemented with the following aspects.

1. The information retrieval section acquires the host identification information associated with the key information and the hash value of the same from the layout information storage section of the processor to which the information retrieval section itself belongs when the acquired processor identification information is the identification of the processor to which the information retrieval section belongs, while the information retrieval section acquires the host identification information associated with the key information and the hash value of the same from the layout information storage section of another processor when the acquired processor identification information is the identification of the other processor.

2. The database system may further comprise a computer connected through a network. In this case, it is desirable that the computer includes a control section which transmits the key information to the information retrieval section to acquire host identification information of the database server having the key information stored in the information storage section thereof from the information retrieval section and which transmits the key information to the information acquisition section of the database server identified by the acquired host identification information to acquire data associated with the key information.

3. In the database system, a client address may be stored as the key information in the information storage section of the database server, and authentication information of the client identified by the client address may also be stored in association with the client address. In this case, it is desirable that the computer transmits the client address of a call source to the information retrieval section of the retrieval server when the client address of the call source, the authentication information of the client, and the address of the call destination are received along with a call request from the outside to acquire host identification information of the database server having the client address of the call source stored in the information storage section thereof from the information retrieval section, transmits the client address of the call source to the information acquisition section of the database server identified by the acquired host identification information to acquire authentication information associated with the client address of the call source, and calls the call destination address to establish a call between the call source and the call destination when a check of the acquired authentication information against the authentication information received from the outside results in a match.

The retrieval server according to the invention may be implemented with the following aspects.

1. In the retrieval server, the information retrieval section may acquire the data associated with the key information and the hash value of the same from the distribution information storage section of the processor to which the information retrieval section itself belongs when the acquired processor identification information is the identification of the processor to which the information retrieval section belongs, while the information retrieval section may acquire the data associated with the key information and the hash value of the same from the distribution information storage section of another processor when the acquired processor identification information is the identification of the other processor.

2. The information retrieval sections of the plurality of processors may process requests according to a preset order.

3. The order in which the information retrieval sections of the plurality of processors process requests may be based on a round-robin method.

4. The distribution information storage section and the processor information storage section may be configured on a memory provided in the processor.

What is claimed is:

1. A database system comprising a plurality of database servers and a retrieval server connected to the plurality of database servers through a network and including a plurality of processors, each of the plurality of database servers being a given database server comprising:

an information storage section that stores data in association with key information to store different data in the given database server; and an information acquisition section that acquires, upon receipt of key information, data associated with the received key information from the information storage section;

each of the processors of the retrieval server comprising:

a layout information storage section that stores a different record in each processor based on a hash value of a plurality of hash values, one record being formed by associating the key information, the hash value of the key information, and host identification information identifying the given database server having the information storage section holding data identified by the key information;

a processor information storage section that stores association between each of the hash values stored in the layout information storage sections provided in all of the processors and processor identification information identifying the processor having the layout information storage section in which the hash value is stored; and an information retrieval section that calculates, upon receipt of key information, the hash value of the received key information, acquires processor identification information associated with the hash value from the processor information storage section, identifies a processor based on the acquired processor identification information, and acquires host identification information associated with the key information and the hash value of the key information from the layout information storage section of the processor thus identified, the database system further comprising a control section which transmits the key information to the information retrieval section to acquire host identification information of the given database server having the key information stored in the information storage section thereof from the information retrieval section and which transmits the key information to the information acquisition section of the given database server identified by the acquired host identification information to acquire data associated with the key information from the given database server identified by the acquired host identification information, wherein a client address is stored as the key information in the information storage section of the given database server, authentication information of the client identified by the client address being also stored in association with the client address; and when the client address of a call source, the authentication information of the client, and the address of a call destination are received along with a call request from the outside, the computer transmits the client address of the call source to the information retrieval section of the retrieval server to acquire host identification information of the given database server having the client address of the call source stored in the information storage section thereof from the information retrieval section, transmits the client address of the call source to the information acquisition section of the given database server identified by the acquired host identification information to acquire authentication information associated with the client address of the call source, and, when a check of the acquired authentication information against the authentication information received from the outside results in a match, calls the call destination address to establish a call between the call source and the call destination.

2. The database system according to claim 1, wherein when the acquired processor identification information is the identification of the processor to which the information retrieval section belongs, the information retrieval section acquires the host identification information associated with the key information and the hash value of the key information from the layout information storage section of the processor to which the information retrieval section itself belongs;

wherein when the acquired processor identification information is the identification of another processor, the information retrieval section acquires the host identification information associated with the key information and the hash value of the key information from the layout information storage section of the other processor; and wherein the information retrieval sections of the plurality of processors sequentially accept and process requests.

3. A retrieval server for use in a database system comprising a plurality of database servers, each of the plurality of database servers being a given database server comprising:

an information storage section that stores data in association with key information to store different data in the given database server; and an information acquisition section that acquires, upon receipt of key information, data associated with the received key information from the information storage section;

the retrieval server being connected to the plurality of database servers through a network and including a plurality of processors, each of the processors comprising:

a layout information storage section that stores a different record in each processor based on a hash value of a plurality of hash values, one record being formed by associating key information, the hash value of the key information, and host identification information identifying the (liven database server holding data identified by the key information;

a processor information storage section that stores association between each of the hash values stored in the layout information storage sections provided in all of the processors and processor identification information identifying the processor having the layout information storage section in which the hash value is stored; and an information retrieval section that calculates, upon receipt of key information from the outside as a retrieval condition, a hash value of the received key information, acquires processor identification information associated with the hash value from the processor information storage section, identifies a processor based on the acquired processor identification information, and acquires host identification information associated with the key information and the hash value of the key information from the layout information storage section of the processor thus identified, the database system further comprising a control section which transmits the key information to the information retrieval section to acquire host identification information of the given database server having the key information stored in the information storage section thereof from the information retrieval section and which transmits the key information to the information acquisition section of the (liven database server identified by the acquired host identification information to acquire data associated with the key information, wherein a client address is stored as the key information in the information storage section of the (liven database server, authentication information of the client identified by the client address being also stored in association with the client address; and the computer transmits the client address of a call source to the information retrieval section of the retrieval server when the client address of the call source, the authentication information of the client, and the address of the call destination are received along with a call request from the outside to acquire host identification information of the given database server having the client address of the call source stored in the information storage section thereof from the information retrieval section, transmits the client address of the call source to the information acquisition section of the given database server identified by the acquired host identification information to acquire authentication information associated with the client address of the call source, and calls the call destination address to establish a call between the call source and the call destination when a check of the acquired authentication information against the authentication information received from the outside results in a match.

4. The retrieval server according to claim 3, wherein the information retrieval sections of the plurality of processors process the requests according to a preset order.

5. The retrieval server according to claim 3, wherein the order in which the information retrieval sections of the plurality of processors process requests is based on a round-robin method.

6. The retrieval server according to claim 3, wherein the layout information storage section and the processor information storage section are configured on a memory provided in the processor.

7. The retrieval server according to claim 3, wherein when the acquired processor identification information is the identification of the processor to which the information retrieval section belongs, the information retrieval section acquires the host identification information associated with the key information and the hash value of the key information from the layout information storage section of the processor to which the information retrieval section itself belongs;

wherein when the acquired processor identification information is the identification of another processor, the information retrieval section acquires the host identification information associated with the key information and the hash value of the key information from the layout information storage section of the other processor; and wherein the information retrieval sections of the plurality of processors sequentially accept and process requests.

* * * * *